United States Patent
Kim

(10) Patent No.: US 8,887,198 B2
(45) Date of Patent: Nov. 11, 2014

(54) DISPLAY DEVICE AND METHOD FOR SEARCHING CHANNEL

(75) Inventor: Eunyoung Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 645 days.

(21) Appl. No.: 12/863,515

(22) PCT Filed: Nov. 7, 2008

(86) PCT No.: PCT/KR2008/006589
§ 371 (c)(1),
(2), (4) Date: Jul. 19, 2010

(87) PCT Pub. No.: WO2009/096654
PCT Pub. Date: Aug. 6, 2009

(65) Prior Publication Data
US 2010/0293574 A1    Nov. 18, 2010

(30) Foreign Application Priority Data

Jan. 31, 2008  (KR) .......................... 10-2008-0010000

(51) Int. Cl.
| | |
|---|---|
| H04N 5/445 | (2011.01) |
| G06F 3/00 | (2006.01) |
| G06F 13/00 | (2006.01) |
| H04N 21/438 | (2011.01) |
| H04N 21/434 | (2011.01) |
| H04N 21/485 | (2011.01) |
| H04N 5/50 | (2006.01) |

(52) U.S. Cl.
CPC .............. *H04N 5/50* (2013.01); *H04N 21/4384* (2013.01); *H04N 21/4383* (2013.01); *H04N 21/4345* (2013.01); *H04N 21/485* (2013.01)

USPC .............. 725/38; 348/731; 348/732; 348/734

(58) Field of Classification Search
CPC . H04N 5/50; H04N 21/4345; H04N 21/4383; H04N 21/4384; H04N 21/485
USPC ........................ 725/38, 39; 348/731, 732, 734
See application file for complete search history.

(56) References Cited

U.S. PATENT DOCUMENTS

| | | | |
|---|---|---|---|
| 2004/0078830 A1 * | 4/2004 | Onomatsu ..................... 725/135 |
| 2004/0105031 A1 * | 6/2004 | Shibusawa .................... 348/570 |

(Continued)

FOREIGN PATENT DOCUMENTS

| | | |
|---|---|---|
| KP | 10-2007-0055797 | 5/2007 |
| KR | 10-1997-0057445 | 7/1997 |

(Continued)

OTHER PUBLICATIONS

International Search Report issued in PCT/KR2008/006589 dated Apr. 30, 2009.

(Continued)

*Primary Examiner* — Brian T Pendleton
*Assistant Examiner* — Alan Luong
(74) *Attorney, Agent, or Firm* — Ked & Associates, LLP

(57) ABSTRACT

Provided are a display device and a channel search method thereof. The display device comprises: a key input unit for inputting a request command from a user; a tuner unit for sequentially searching broadcast channels of each band according to a channel search command input from the key input unit; and a control unit for controlling a channel re-search to be performed sequentially from an already-searched channel when a channel re-search command is input from the key input unit during the sequential channel search.

8 Claims, 3 Drawing Sheets

(56) References Cited

U.S. PATENT DOCUMENTS

| | | | |
|---|---|---|---|
| 2005/0036073 A1* | 2/2005 | Bae et al. | 348/732 |
| 2005/0073614 A1 | 4/2005 | Yukiyoshi | 348/732 |
| 2005/0134747 A1* | 6/2005 | Seo | 348/732 |
| 2005/0166226 A1* | 7/2005 | Modi | 725/38 |
| 2006/0114361 A1 | 6/2006 | Suzu | 348/732 |
| 2006/0203129 A1 | 9/2006 | Takagi et al. | 348/731 |
| 2007/0229715 A1* | 10/2007 | Chang | 348/731 |

FOREIGN PATENT DOCUMENTS

| | | |
|---|---|---|
| KR | 10-1999-0051241 | 7/1999 |
| KR | 10-2007-0005356 | 1/2007 |

OTHER PUBLICATIONS

European Search Report dated Jul. 1, 2011 issued in Application No. 08 87 1816.

* cited by examiner

DISPLAY DEVICE AND METHOD FOR SEARCHING CHANNEL

TECHNICAL FIELD

The present disclosure relates to a display device and a channel search method thereof, which makes it possible to re-search a searched section during a channel search operation.

BACKGROUND ART

A typical example of a display device is a television (TV). With the recent development of broadcast technology, a broadcast signal transmission method has advanced and an interest in a digital TV based on a digital transmission method has increased.

The digital TV transmits an analog broadcast signal in a digital format, thus making it possible to minimize a noise effect and to provide an easy reproduction of an original image.

Unlike a conventional display device capable of receiving only airwave channel, a recent display device can receive various broadcast channels through a cable or satellite broadcast, thus providing about 50 to about 100 or more channels to users.

Also, a user performs an automatic channel search if a display device is initially installed or if a channel search is necessary due to a signal environment change.

Herein, the automatic channel search is a technology that determines the channel effectiveness sequentially from the start channel number to the last channel number and constructs a channel map on the basis of the effective channel information.

Because the automatic channel search is performed on all the channels, it requires a lot of time and thus provides a band or channel skip function for the user's convenience.

DISCLOSURE OF INVENTION

Technical Problem

Embodiments provide a display device and a channel search method thereof, which can perform a channel re-search operation on a section including searched bands and channels during a normal channel search operation.

Embodiments also provide a channel search function that can reduce the frequency of search of all the channels, thereby making it possible to reduce a channel search time and increase a user's convenience.

The details of one or more embodiments are set forth in the accompanying drawings and the description below. Other features will be apparent from the description and drawings, and from the claims.

Technical Solution

In one embodiment, a display device comprises: a key input unit for inputting a request command from a user; a tuner unit for sequentially searching broadcast channels of each band according to a channel search command input from the key input unit; and a control unit for controlling a channel re-search to be performed sequentially from an already-searched channel when a channel re-search command is input from the key input unit during the sequential channel search.

In another embodiment, a channel search method of a display device comprises: searching broadcast channels of each band sequentially; inputting a channel re-search command during the sequential broadcast channel search; setting a current search channel as a previously-searched channel in response to the channel re-search command input; and performing a channel re-search sequentially from the set channel.

Advantageous Effects

The present invention provides a channel re-search function for a searched section. Thus, even if a band or channel skip occurs due to the user's carelessness, the present invention can easily compensate such an error. Also, the present invention can perform the channel re-search for the searched section according to the need of the user, thereby making it possible to satisfy the user's desire.

That is, the present invention increases the usable range of the whole channel search and reduces the frequency of the whole channel search, thereby making it possible to reduce a channel search time and to provide the user's convenience.

BEST MODE FOR CARRYING OUT THE INVENTION

Reference will now be made in detail to the embodiments of the present disclosure, examples of which are illustrated in the accompanying drawings.

Figure 1:
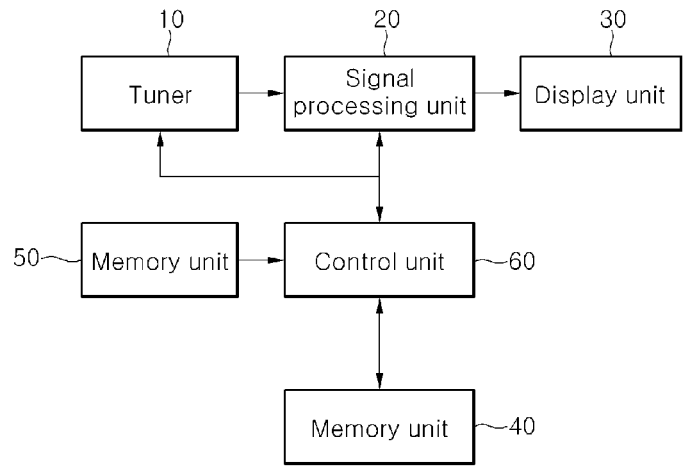
FIG. 1 is a block diagram of a display device according to an exemplary embodiment.

FIG. 1 is a block diagram of a display device according to an exemplary embodiment.

Referring to FIG. 1, the display device includes: a tuner unit 10 for sequentially searching broadcast channels of each band according to an input channel search command; a signal processing unit 20 for dividing a broadcast signal, input through the tuner unit 10, into video data, audio data, and various additional data and processing the video data and the audio data to be suitable for output; a display unit 30 for displaying the processed video data; a memory unit 40 for storing a channel map including information about channels of actual effective signal input; a key input unit 50 for inputting a request command from a user; and a control unit 60 for controlling a channel re-search to be performed sequentially from an already-searched channel when a channel re-search command is input from the key input unit 50 during the sequential channel search operation of the tuner unit 10.

Hereinafter, a detailed operation of the display device will be described in detail.

The tuner unit 10 selects a broadcast channel of a specific frequency band according to a tuning control signal of the control unit 60 to receive a broadcast signal of the selected broadcast channel. Herein, the tuner unit 10 may include an antenna, a cable connector, a receiver such as a settop box, a tuner, a demodulator and a decoder.

Among the broadcast signal received through the tuner unit 10, a video signal is processed by the signal processing unit 20 to be displayed by the display unit 30.

Herein, the signal processing unit 20 may include: a demultiplexer for dividing a broadcast signal, demodulated by the tuner unit 10, into video data, audio data, and various additional data to output the same in a bit stream format; a video decoder for decoding the video data; and a scaler for converting the decoded video signal in accordance with a vertical frequency, a resolution, and an aspect ratio according to the output standards of the display unit 30; and an audio decoder for decoding the audio data.

Also, the display unit 30 may be implemented using various display modules such as Digital Light Processing (DLP), Liquid Crystal Display (LCD), and Plasma Display Penal (PDP).

The memory unit 40 is used to store various data, and may include an Electrically Erasable and Programmable Read Only Memory (EEPROM).

Also, the memory unit 40 may store a driving program necessary for a channel search operation of the tuner 10, and stores a channel map including information about channels of actual effective signal input among the broadcast channels searched by the tuner 10.

That is, a channel search is performed continuously from the start channel to the end channel, and a channel map including information about channels of actual effective signal input is stored according to the channel search results.

Also, the memory unit 40 stores information about each band and channel configuration information in each band. Accordingly, the tuner unit 10 performs a channel search while increasing a channel number sequentially one by one by using the stored band information and channel configuration information.

Herein, the band information include information about antenna analog broadcast, antenna digital broadcast, cable analog broadcast, and cable digital broadcast, which will be described later.

The key input unit 50 is used to input a request command from a user, and may include an enter key and key buttons for execution of channel search and channel re-research.

Herein, the key input unit 50 may be implemented using a touchscreen module, a key input module, or a remote receiver module using wireless communication such as infrared communication.

The touchscreen module may be implemented in the display unit 30. The key input module may be implemented to have function keys for setting various functions of a camera-mounting TV. The remote receiver module transfers various button signals, input through a remote controller, to the control unit 60.

Herein, if the key input unit 50 is implemented using the touchscreen module, a function key input may be generated using a finger or a touch pen.

Upon receiving a channel automatic search request from the user, the control unit 60 drives a channel automatic search program, prestored in the memory unit 40, to sequentially search respective channels of each band set.

Figure 2:
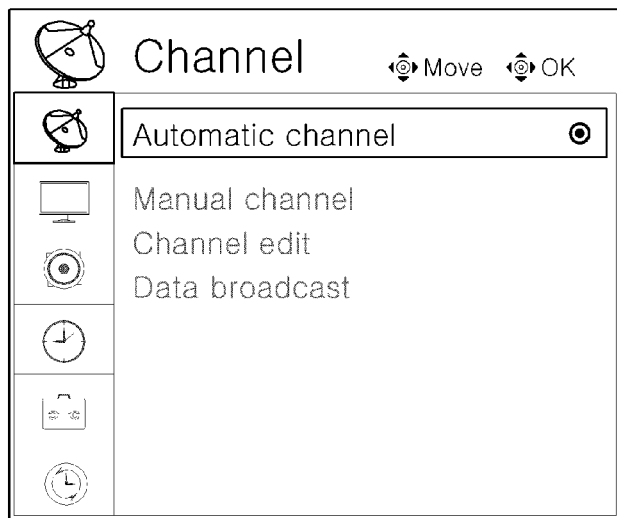
FIG. 2 is a diagram illustrating an example of an automatic channel search setting screen according to an exemplary embodiment.

FIG. 2 is a diagram illustrating an example of an automatic channel search setting screen according to an exemplary embodiment.

Referring to FIG. 2, examples of a channel-related menu include an automatic channel menu, a manual channel menu, a channel edit menu, and a data broadcast menu.

The automatic channel menu is used to sequentially search channels in each band to generate a channel map including information about channels of actual effective signals. When the automatic channel menu is selected by the user, the control unit 60 controls the tuner unit 10 to perform a channel search operation.

Herein, if an antenna connection is abnormal in an antenna input of the display device, or if an effective channel search fails after execution of automatic channel search, a message box is used to report the corresponding information to the user, so that the user checks a connection of an antenna cable.

The manual channel menu is used to manually search a channel whose number is input by the user, which may also be used to delete a specific channel from a channel map of channel edit.

Also, if an indoor or outdoor antenna is used, an effective signal may be input or not through a specific channel according to the installation direction of the antenna. In this case, because the automatic channel menu may fail to search all the channels, the manual channel menu is used to search a specific channel.

The channel edit menu is used to perform channel edit functions such as channel memory, channel deletion, and preference channel registration.

Accordingly, if the automatic channel menu is selected, the control unit 60 uses the band information and the channel configuration information to control the tuner unit 10 to perform a sequential channel search.

Figure 3:
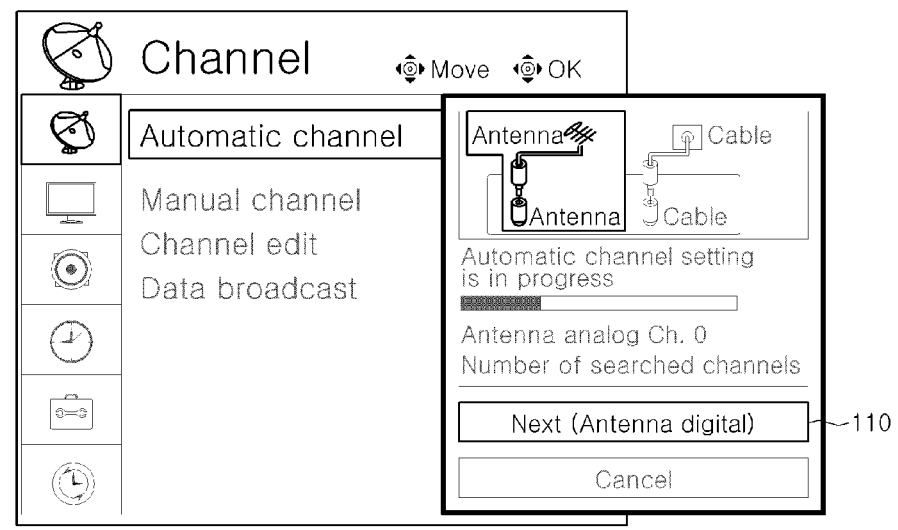
FIG. 3 is a diagram illustrating an example of a channel search process screen according to an exemplary embodiment.

FIG. 3 is a diagram illustrating an example of a channel search process screen according to an exemplary embodiment.

Referring to FIG. 3, when a channel search operation is initiated by the tuner unit 10, information about a band under channel search and information about the number of channels of actual effective signals in the band are displayed on the screen.

Also, the channel search operation is generally performed in the order of an antenna analog band, an antenna digital band, a cable analog band, and a cable digital band, and the band under search may be skipped using a next menu 110.

FIG. 3 illustrates that a search operation is being performed on the antenna analog band. If the next menu 110 is selected during channel search of the antenna analog band, the channel search of the antenna analog band is terminated and a conversion is made to the next band, i.e., the antenna digital band to continue to perform the channel search operation.

Figure 4:
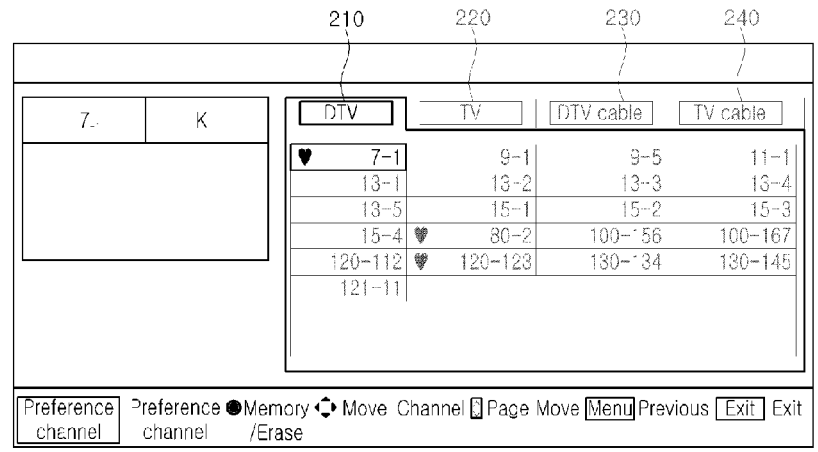
FIG. 4 is a diagram illustrating an example of a channel map screen according to an exemplary embodiment.

FIG. 4 is a diagram illustrating an example of a channel map screen according to an exemplary embodiment.

Referring to FIG. 4, if a channel search operation on all the bands is completed by the tuner unit 10, information about channels of effective signals in each band is stored in the channel map. Herein, a DTV 210 denotes an antenna digital broadcast; a TV 220 denotes an antenna analog broadcast; a DTV cable 230 denotes a cable digital broadcast; and a TV cable 240 denotes a cable analog broadcast.

When the channel search operation is sequentially performed on each band as described above, if a channel re-search command is input through the key input unit 50, the control unit 60 controls the tuner unit 10 to perform a channel re-search sequentially from the searched channel.

That is, if the channel re-search command is input through the key input unit 50, the control unit 60 sets a channel number for start of the channel re-search to perform the channel re-search sequentially from the set channel.

Herein, the channel number for start of the channel re-search may be set by the following two methods.

The first method is a setting method by channel number reduction, and the second method is a channel number selection method by display of an On-Screen Display (OSD).

In the setting method by channel number reduction, the start channel number for channel re-search is set by the user, which may be set in the channel re-search command input process.

That is, if the channel re-search command is input by sequential key input, the control unit 60 reduces the under-search channel number in reverse order. If the sequential key input is disabled during the channel number reduction, the control unit 60 sets the channel number of the disabled point as the channel number for start of the channel re-search.

In other words, before selection of the next search channel, the control unit 60 determines whether the channel re-search command is input. If the channel re-search command is not input, the control unit 60 controls the tuner unit 10 to perform a sequential channel search operation. Also, if the channel re-search command is input, the control unit 60 reduces the current search channel number one by one in reverse order.

Herein, if the channel re-search command is input by sequential key input, the control unit 60 continues the channel number reducing operation.

Also, if the channel re-search command is continuously input even after lapse of a predetermined time during the continuous channel number reduction, various methods such as five channel number reduction may be used.

Also, if the set channel number reaches the first channel of a specific band during the channel number reduction, a channel number reduction of 1 from the last channel of the previously-searched band is made to change the current search channel number.

Also, the control unit 60 reduces the channel number in reverse order with respect to only specific channels of a specific band or specific bands set as a skip section during the channel search, thereby making it possible to rapidly shift to the channel number desired by the user.

That is, because the above channel re-search is performed mostly due to mis-setting of a skip section during the channel search, the channel number is reduced with respect to only a channel section skipped by the user, i.e., a section whose channels are not searched during the normal channel search operation.

Herein, if the channel number is reduced to the first channel number of the first band, because the channel search restarts from the first, the control unit 60 disables the channel re-search setting.

Also, if a band skip command is input from the key input unit 50 during the channel number reduction, the control unit 60 shifts from the current band to the last channel of the immediately previous band and continues the channel reduction from the last channel of the previous band.

If the channel re-search is restarted from the first due to the channel re-search setting, the current channel search point has only to be advanced. Therefore, a search section change is possible without an additional system load.

Also, if the user disables the channel re-search at the point of reaching a desired section of the user, the channel search restarts from that point. Therefore, the channel re-search can be performed even during the channel search by returning to a certain section.

Herein, the channel re-search setting can be detected by pressing a specific key allocated for the channel re-search setting, by the user, through the key input unit 50. While the user is continuing to press the specific key, it is determined that the channel re-search is in progress. Also, the disable point of the specific key can be detected as the disable point of the channel re-search setting.

Also, the second method is a channel number selection method by display of the OSD. That is, if the channel re-search command is input, the control unit 60 controls the display unit 30 to display an OSD screen for selection of a start channel number for the channel re-search.

Herein, the OSD screen may be displayed in a channel map format as illustrated in FIG. 4.

That is, information about the searched band and channel information of each band are displayed until the input point of the channel re-search command so that a specific channel number desired by the user can be selected from the displayed channel information of each band.

If the setting of the start channel number for the channel re-search is completed as described above, the control unit 60 sets the set channel number as the current search channel number and outputs a control signal to the tuner unit 10 so that the channel re-search is performed sequentially from the set channel number.

As described above, the display device according to the embodiment provides the channel re-search function for the searched section. Thus, even if a band or channel skip occurs due to the user's carelessness, the display device can easily compensate such an error. Also, the display device can perform the channel re-search for the searched section according to the need of the user, thereby making it possible to satisfy the user's desire.

That is, the usable range of the whole channel search increases and the frequency of the whole channel search decreases, thereby making it possible to reduce a channel search time and to provide the user's convenience.

Figure 5:
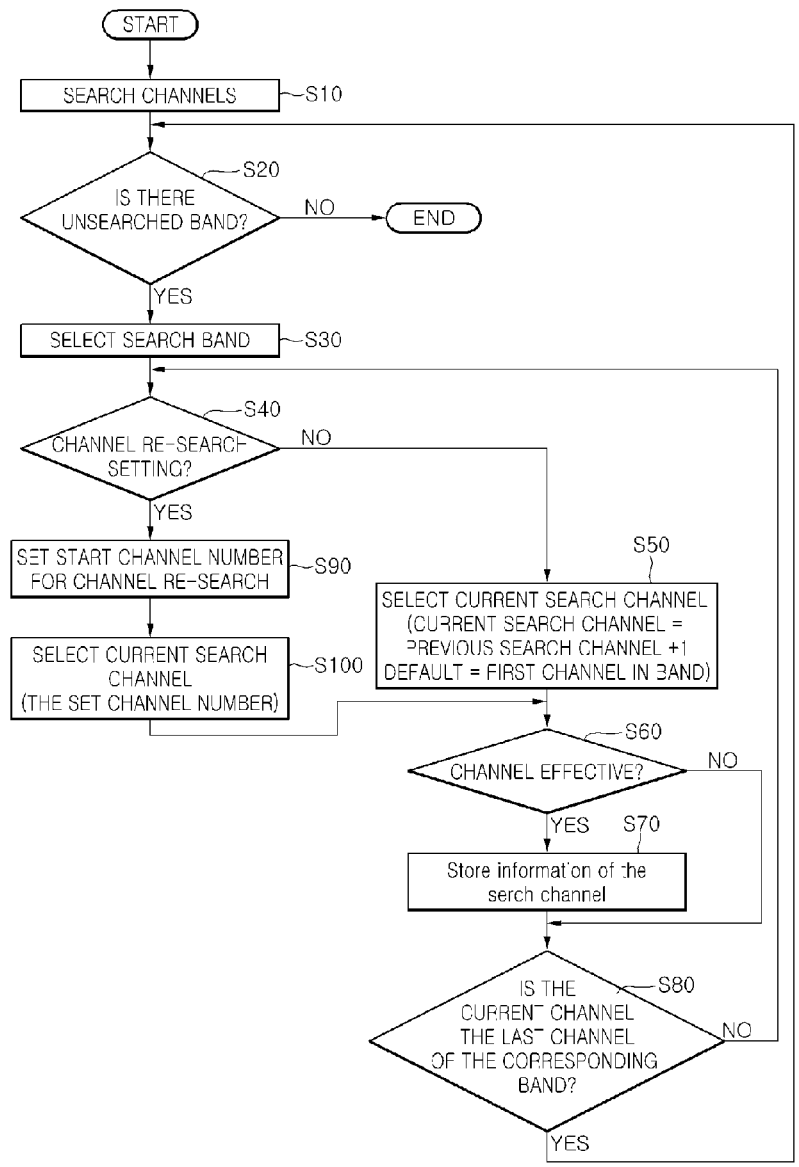
FIG. 5 is a flowchart illustrating a channel search method of a display device according to an exemplary embodiment.

FIG. 5 is a flowchart illustrating a channel search method of the display device according to an exemplary embodiment.

Referring to FIG. 5, the channel search method performs a channel search at the user's request (S10). Herein, the channel search may be performed sequentially from the first channel of the first band, or may be performed in reverse order from the last channel of the last band.

Then, the method determines if there are unsearched bands whose channels are not searched as yet (S20).

If there are unsearched band (S20), the method selects a channel search band among the unsearched bands (S30).

Then, the method determines if a channel re-search setting command is input (S40).

If the channel re-search setting command is not input (S40), the method selects a current search channel (S50). That is, the method sets a channel next to the previous search channel as the current search channel. Also, if the channel re-search setting command is not input (S40), the method sets the first channel of the corresponding band as the search channel.

Then, the method determines if there is an effective broadcast signal in the set search channel (S60).

If there is an effective broadcast signal in the set search channel (S60), the method stores information about the search channel (S70).

Then, the method determines if the search channel is the last channel of the corresponding band (S80).

If the search channel is the last channel of the corresponding band (S80), the method returns to the S20; and if not, the method returns to the S40.

Meanwhile, if the channel re-search setting command is input (S40), the method sets a start channel number for the channel re-search (S90). A method of setting the start channel number for the channel re-search will be described later in detail with reference to FIGS. 6 and 7.

Then, the method sets the start channel number for the channel re-search as the current search channel number (S100) and proceeds to the S60.

Hereinafter, a detailed description will be given of the method of setting the start channel number for the channel re-search (S90).

Figure 6:
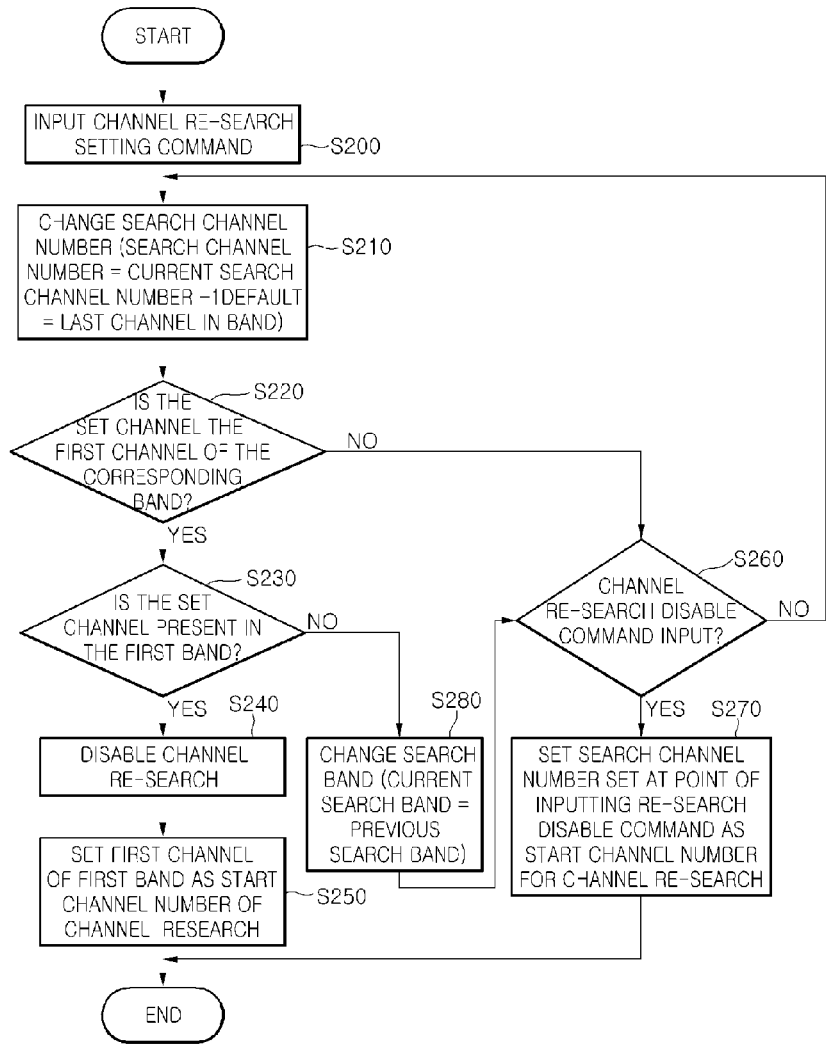
FIG. 6 is a detailed flowchart illustrating a channel search method of a display device according to an exemplary embodiment.

FIG. 6 is a flowchart illustrating a channel number setting method according to an exemplary embodiment.

Referring to FIG. 6, the channel number setting method inputs a channel re-search setting command (S200).

Then, in response to the channel re-search setting command, the method changes the current search channel (S210). That is, the method reduces the currently-set search channel number by a predetermined number. Herein, the predetermined number may vary depending on the input method of the channel re-search setting command.

Also, only bands or channels set as a skip section during the normal channel search by the user are included in the reduction target, and channels of a band not set as the skip section are excluded from the reduction target.

Also, if a band skip command is received during the channel number reduction, the method shifts from the current band to the last channel of the immediately previous band to continue the channel number reduction.

Then, the method determines if the set channel is the first channel of the corresponding band (S220).

Then, if the set channel is the first channel of the corresponding band (S220), the method determines if the set channel is present in the first band (S230).

Then, if the set channel is present in the first band (S230), the method disables the set channel re-search (S240).

Then, the method sets the first channel of the first band as a start channel number for channel re-search (S250).

Meanwhile, if the set channel is not the first channel of the corresponding band (S220), the method determines if a channel re-search disable command is input (S260).

Then, if a channel re-search disable command is input (S260), the method sets a channel number set at the point of inputting the re-search disable command as the start channel number for the channel re-search (S270).

Also, if a channel re-search disable command is not input (S260), the method returns to the step S210.

Also, if the set channel is not present in the first band (S230), the method changes the search band (S280). That is, the previous band of the current set band is set as the current search band.

As described above, the channel number setting method according to the exemplary embodiment reduces the search channel number in reverse order on the basis of the sequential key input by the user and sets the search channel number set at the key input disable point as the start channel number for the channel re-search.

Figure 7:
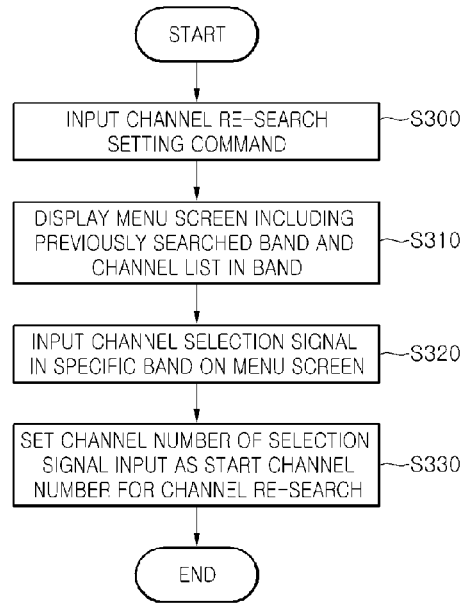
FIG. 7 is a detailed flowchart illustrating a channel search method of a display device according to another exemplary embodiment.

FIG. 7 is a flowchart illustrating a channel number setting method according to another exemplary embodiment.

Referring to FIG. 7, the channel number setting method inputs a channel re-search setting command (S300).

Then, in response to the channel re-search setting command, the method displays a menu screen including a previously-searched band and a channel list in the band (S310).

Then, the method inputs a selection signal of a channel in a specific band on the menu screen (S320).

Then, the method sets the channel in the specific band of the selection signal input as the start channel number for the channel re-search (S330).

As described above, the channel number setting method according to the another embodiment selects only the specific channel number desired by the user. Therefore, the channel number setting method according to the another embodiment can set the start channel number for the channel re-search more rapidly than the channel number setting method according to the exemplary embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The present invention is industrially applicable because it can be used in a display device providing a broadcast program search function.

The invention claimed is:

1. A display device comprising:
a key input unit configured to input a request command from a user;
a tuner unit configured to sequentially search broadcast channels of each band including first and second bands according to a channel search command input from the key input unit, wherein each of the first and second bands include a plurality of broadcast channels; and
a control unit configured to skip channels or band from a current search channel or band to a next channel or band without a channel search operation when a skip command is inputted from the key input unit during the sequential channel search operation of the tuner unit, to set a start channel number for a channel re-search within a skip section of the skipped band or channels when a channel re-search command is input from the key input unit during a sequential search of the broadcast channels, and to re-perform the sequential search of the broadcast channels from a broadcast channel corresponding to the start channel number,
wherein the tuner unit is configured to sequentially search broadcast channels from a first channel of the second band after the channel search operation of all broadcast channels of the first band is completed, and
wherein the control unit is configured to reduce the current search channel number within the skip section of the skipped band or channels when the channel re-search command is inputted within a predetermined period, and to set a reduced channel number as the start channel number for the channel re-search when the channel re-search command is not inputted within the predetermined period.

2. The display device according to claim 1, wherein the key input unit is allocated additional key for the channel re-search setting and disable.

3. The display device according to claim 1, further comprising a memory unit configured to store information about each band and channel configuration information in each band.

4. The display device according to claim 1, wherein if the reduced channel number is reached to the first channel of the current band during the channel number reduction, the control unit shifts the reduced channel number to a last channel of the previous band to continue the channel number reduction.

5. The display device according to claim 1, wherein if the skip command is inputted during the channel number reduction, the control unit shifts the reduced channel number from the current channel of the current band to the last channel of the immediately previous band to continue the channel number reduction.

6. The display device according to claim 1, further comprising a display unit configured to display a menu screen for setting the start channel number for the channel re-search within a skip section of the skipped band or channels.

7. A channel search method of a display device, comprising:
    sequentially searching broadcast channels of each band including first and second bands, wherein each of the first and second bands include a plurality of broadcast channels;
    skipping channels or band from a current search channel or band to a next channel or band without a sequential channel search operation when a skip command is inputted during the sequential channel search operation;
    inputting a channel re-search command during the sequential broadcast channel search;
    setting a start channel number for a channel re-search, within a skip section of the skipped band or channels when the channel re-search command is inputted during search of the sequential broadcast channels; and
    re-performing the sequential broadcast channels search from a broadcast channel corresponding to the start channel number,
    wherein the sequentially searching broadcast channels includes searching from first channel of the second band after the channel search operation of all broadcast channels in the first band is completed, and
    wherein the setting the start channel number includes
    reducing a current search channel number within the skip section of the skipped band or channels when the channel re-search command is inputted within a predetermined period, and
    setting a reduced channel number as the start channel number for the channel re-search when the channel re-search command is not inputted within the predetermined period.

8. The channel search method according to claim 7, wherein the setting the start channel number comprises:
    displaying a menu screen for setting the start channel number for the channel re-search within the skip section of the skipped band or channels; and
    setting a specific channel selected on the displayed menu screen as the start channel number for the channel re-search.

* * * * *